J. W. HARBIN.
Corn-Planter.

No. 200,286.  Patented Feb. 12, 1878.

Attest:
Walter Knight
L. H. Bond

Inventor
James W. Harbin
By Knight Bros.
Attys

UNITED STATES PATENT OFFICE.

JAMES W. HARBIN, OF EVANSVILLE, INDIANA, ASSIGNOR OF ONE-HALF HIS RIGHT TO GEORGE W. HARBIN, OF WATERLOO, IOWA.

IMPROVEMENT IN CORN-PLANTERS.

Specification forming part of Letters Patent No. 200,286, dated February 12, 1878; application filed October 8, 1877.

*To all whom it may concern:*

Be it known that I, JAMES W. HARBIN, of Evansville, Vanderburg county, Indiana, have invented a new and useful Improvement in Corn - Planters, of which the following is a specification:

My invention relates to improvements in those grain-delivering devices of corn-planters which employ a rotating wheel or cylinder having peripheral recesses for picking up and delivering the corn grain by grain, in connection with a brush or other suitable cut-off, and with a ground-wheel.

Figure 1:
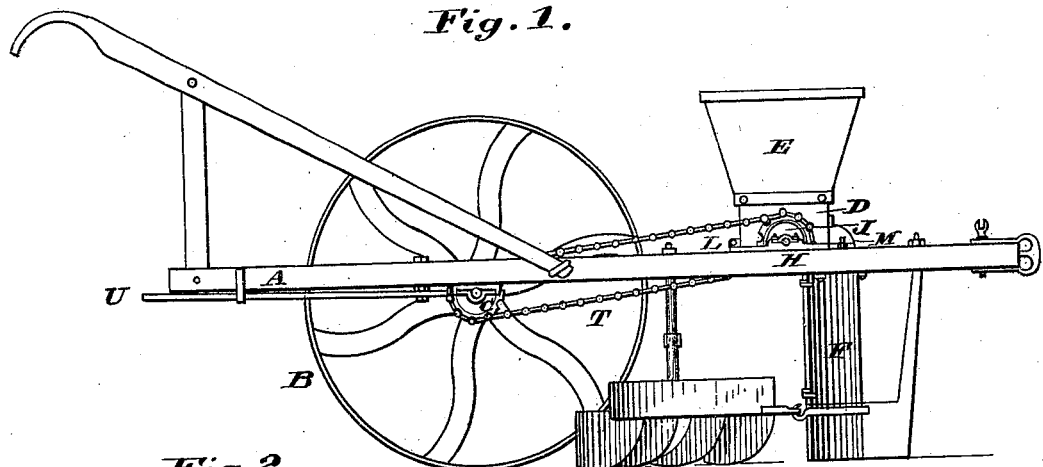
Figure 2:
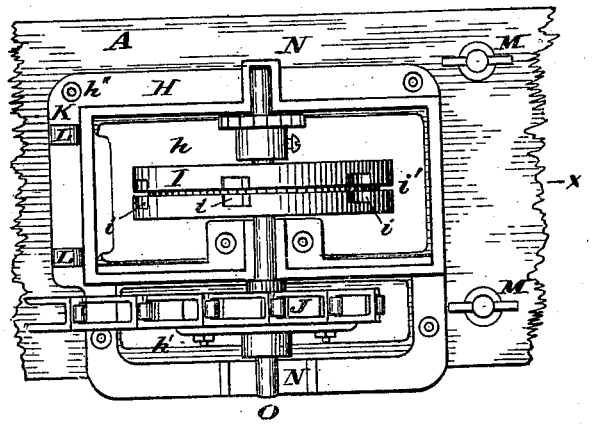
Figure 5:
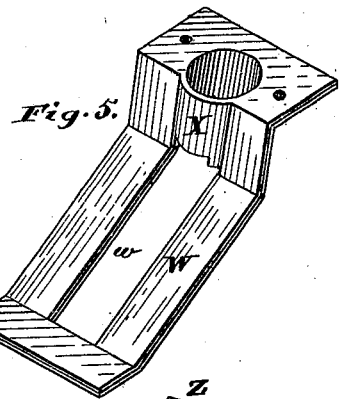
Figure 4:
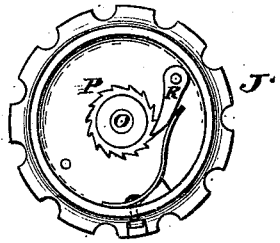
Figure 3:
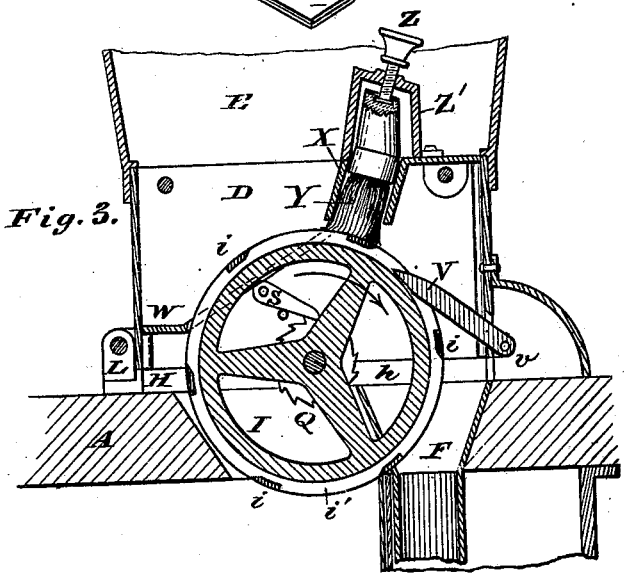

In the accompanying drawings, Figure 1 is a side elevation of a planter embodying my improvements. Fig. 2 is a top view of the grain-delivering mechanism without its box, ejector, and cut-off mechanism. Fig. 3 is a section at the line $x\,x$. Fig. 4 represents my sprocket-wheel without its cap. Fig. 5 represents my cut-off diaphragm and brush-socket.

A may represent the frame, B C the ground-wheel and sprocket, D E the grain box and hopper, and F the delivery-spout, of an ordinary or any suitable corn-planter.

My bed-plate A consists of a rectangular open casting, having openings $h$ and $h'$ for the feed and sprocket wheels I and J, and holes $h''$ for the bolts K, which fasten said plate H to the main frame A.

Lugs L upon bed-plate H enable the hinging to it of the seed-box D, whose forward edge is secured by buttons M.

Journaled in suitable bearings N in the bed-plate and box is the shaft O of my feed-wheel I, which is keyed fast to said shaft. Also keyed fast to shaft O is the propelling-ratchet P and the tentative ratchet-wheel Q.

Loosely sleeved upon shaft O is my sprocket-wheel J, containing a feed-hand, R, which, on each forward movement of the sprocket, compels a corresponding rotation of the ratchet-wheel P, and consequently of the shaft O and feed-wheel I, while any retrograde rotation of the said wheel is prevented by pawl S.

The sprocket J is connected with a similar sprocket, C, on the ground-wheel shaft by a metallic endless chain, T.

A lever, U, enables the operator to slide the sprocket C either in or out of gear with the ground-wheel shaft, so as to be rendered inoperative whenever it is merely desired to move the implement from place to place.

My feed-wheel I has, at suitably-spaced equidistant points around its periphery, cups or cavities $i$ of the represented rectangular contour in plan, and in transverse section of the shallow pan-like shape, whose depth is just sufficient to take a single kernel of corn or more, as desired, and having the represented abrupt rear and sloping front end, said rectangular plan, in conjunction with such sloping front, insuring the easy entrance of the kernel within the cavity, and, in conjunction with such abrupt rear, insuring the retention within the cavity of the kernel while being carried upward and forward by the grain-wheel. Said grain-wheel has a circumferential groove, $i'$, of somewhat greater depth than the cavities $i$, to receive the tip or point of a piece of metal, which I call my "ejecting-tongue," V, which piece is pivoted at $v$ to the front wall of the box D.

My cut-off diaphragm W is secured obliquely from the lower rear to the upper front portion of the box in such position as to be partly penetrated by the feed-wheel I, for which a suitable slot, $w$, is provided in the said diaphragm, so that said wheel always presents one cavity to the compartment above the said diaphragm, as seen in Fig. 3. Formed in or attached to the diaphragm is the socket X of my cut-off brush Y, which brush has an adjusting-screw, Z, mounted in a cap, Z', which surmounts the socket X.

The peculiar seed-cavities $i$, with oblique front and radial rear walls, operate, in conjunction with the gravitating-tongue V, to measure one or any desired number of kernels with certainty and uniformity, and eject them at the precise point required.

I claim as new and of my invention—

1. The grain-delivering wheel I, having the peripheral cups or cavities $i$, of rectangular plan, and having the radial rear and oblique front wall, as and for the purpose set forth, and the deep circumferential groove $i'$, in combination with the gravitating or self-adjusting ejecting-tongue V, whose point is made beveling, and underlies said cavities, the whole being arranged and adapted to operate in the manner designated.

2. In the grain-box D of a corn-planter, the slotted oblique diaphragm W w, having the socket X and adjustable cut-off Y Z, and inclosing the upper half of a peripheral grain-wheel, I, substantially as set forth.

3. In combination with the hinged grain-box D and the wheels I and J, the bed-plate H, having the openings h and h' for the grain and sprocket wheels, respectively, bearings N for the seed-distributer shaft, and lugs L for hinging the grain-box.

4. The combination of the metallic endless-chain connection T, sprocket-wheel J, ratchet-wheels P Q, pawls R S, grain-wheel shaft O, and grain-wheel I, as and for the purpose set forth.

5. In combination with the brush shield or socket X in the diaphragm W w, the separable cap-piece Z', having the adjusting-screw Z, as and for the purpose designated.

In testimony of which invention I hereunto set my hand.

JAMES W. HARBIN.

Attest:
GEO. H. KNIGHT,
WALTER KNIGHT.